US009074909B2

(12) United States Patent
Ozaki et al.

(10) Patent No.: US 9,074,909 B2
(45) Date of Patent: Jul. 7, 2015

(54) NAVIGATION SYSTEM, NAVIGATION METHOD, AND NAVIGATION PROGRAM

(75) Inventors: Naokazu Ozaki, Nishio (JP); Naoyuki Kurauchi, Nishio (JP)

(73) Assignee: AISIN AW CO., LTD., Anjo (JP)

( * ) Notice: Subject to any disclaimer, the term of this patent is extended or adjusted under 35 U.S.C. 154(b) by 37 days.

(21) Appl. No.: 13/488,734

(22) Filed: Jun. 5, 2012

(65) Prior Publication Data
US 2013/0006518 A1    Jan. 3, 2013

(30) Foreign Application Priority Data
Jun. 30, 2011    (JP) .................................. 2011-146740

(51) Int. Cl.
*G01C 21/36*    (2006.01)
(52) U.S. Cl.
CPC ................................... *G01C 21/3644* (2013.01)
(58) Field of Classification Search
CPC .................. G08G 1/096827; G08G 1/096872; G01C 21/3415; G01C 21/3461; G01C 21/30
USPC ......... 701/414, 420, 421, 423, 424, 465, 468, 701/533, 411, 426, 438, 16, 437, 117; 705/14.4
See application file for complete search history.

(56) References Cited

U.S. PATENT DOCUMENTS

| 6,078,865 A * | 6/2000 | Koyanagi ...................... 701/438 |
| 6,278,943 B1 * | 8/2001 | Yamauchi ...................... 701/443 |
| 6,314,369 B1 * | 11/2001 | Ito et al. .......................... 701/421 |
| 8,554,243 B2 * | 10/2013 | Klassen et al. ............. 455/456.1 |
| 2004/0128066 A1 * | 7/2004 | Kudo et al. .................... 701/204 |
| 2009/0005969 A1 * | 1/2009 | Tamura ......................... 701/202 |
| 2009/0143079 A1 * | 6/2009 | Klassen et al. ............. 455/456.3 |
| 2009/0164115 A1 * | 6/2009 | Kosakowski et al. ......... 701/201 |
| 2014/0018104 A1 * | 1/2014 | Klassen et al. ............. 455/456.2 |

FOREIGN PATENT DOCUMENTS

JP    A-2010-127837    6/2010

* cited by examiner

*Primary Examiner* — Helal A Algahaim
*Assistant Examiner* — Jelani Smith
(74) *Attorney, Agent, or Firm* — Oliff PLC

(57) ABSTRACT

Systems, methods, and programs detect a current position of a movable body, identify a destination for the moveable body, and search for a going route from a departure point to the destination. The systems, methods, and programs search for a returning route from the destination to the departure point and select a landmark for a branch point along the returning route. While the current position is moving along the going route, the systems, methods, and programs provide returning-route guidance regarding the branch point using the selected landmark.

17 Claims, 11 Drawing Sheets

NAVIGATION SYSTEM, NAVIGATION METHOD, AND NAVIGATION PROGRAM

INCORPORATION BY REFERENCE

The disclosure of Japanese Patent Application No. 2011-146740, filed on Jun. 30, 2011, including the specification, drawings, and abstract thereof, is incorporated herein by reference in its entirety.

BACKGROUND

1. Related Technical Fields

Related technical fields include navigation systems, navigation methods, and navigation programs.

2. Related Art

Conventionally, navigation devices that provide guidance for a travel route of a vehicle are utilized. These conventional navigation devices, in case of providing guidance for a right or left turn at an intersection, display an enlarged map including a facility serving as a landmark for the intersection on a display and/or output a distance to the intersection by audio from a speaker when the vehicle reaches within a predetermined distance from the intersection to make a right or left turn, for example.

In addition, navigation devices that provide guidance that enables the user to easily recognize the intersection to make a right or left turn are being proposed. These navigation devices, when the vehicle arrives at a route guidance point, read out a facility serving as a landmark candidate, which exists in the vicinity of a target branch point, from map information, and if the landmark candidate exists in the direction to which the vehicle makes a turn, determine the landmark candidate as a landmark and provide audio route guidance including the landmark (for example, Japanese Patent Application; Publication No. JP-A-2010-127837).

SUMMARY

However, the conventional devices as mentioned above merely focus on the manner to provide guidance, in which the user is able to easily recognize the intersection to access on the currently-traveling route. Consequently, when guidance regarding a facility serving as a landmark for an intersection on a going route from a departure point to a destination is provided, the user temporarily memorizes the landmark. However, after making a right or left turn at the intersection, the user gets less interested in the intersection and forgets the landmark for which the guidance was provided. As a result, on a returning route from the destination of the going route to the departure point of the going route, when passing the same intersection traveled on the going route, the user may not be able to make a turn to a correct direction at the intersection without guidance by the navigation device because the user does not remember the landmark for the intersection. Thanks to the recent wide utilization of the navigation devices, it becomes greatly easy to move to a desired destination. However, the users largely rely on the navigation devices. Thereby, it became more difficult than before for the user to memorize roads.

Exemplary implementations of the broad principles described herein provide a navigation system, a navigation method, and a navigation program that are capable of providing guidance that activates user's memory and thought and enables the user to memorize roads.

Exemplary implementations provide systems, methods, and programs that detect a current position of a movable body, identify a destination for the moveable body, and search for a going route from a departure point to the destination. The systems, methods, and programs search for a returning route from the destination to the departure point and select a landmark for a branch point along the returning route. While the current position is moving along the going route, the systems, methods, and programs provide returning-route guidance regarding the branch point using the selected landmark.

BRIEF DESCRIPTION OF THE DRAWINGS

FIG. 12A shows a T-shaped road. FIG. 12B shows a merging road.

DETAILED DESCRIPTION OF EXEMPLARY IMPLEMENTATIONS

A navigation system, a navigation method, and a navigation program are described in detail below with reference to examples in conjunction with the accompanying drawings. In the following explanation, a case in which the navigation system is installed in a vehicle as a movable body is exemplified.

I. Configuration

Figure 1:
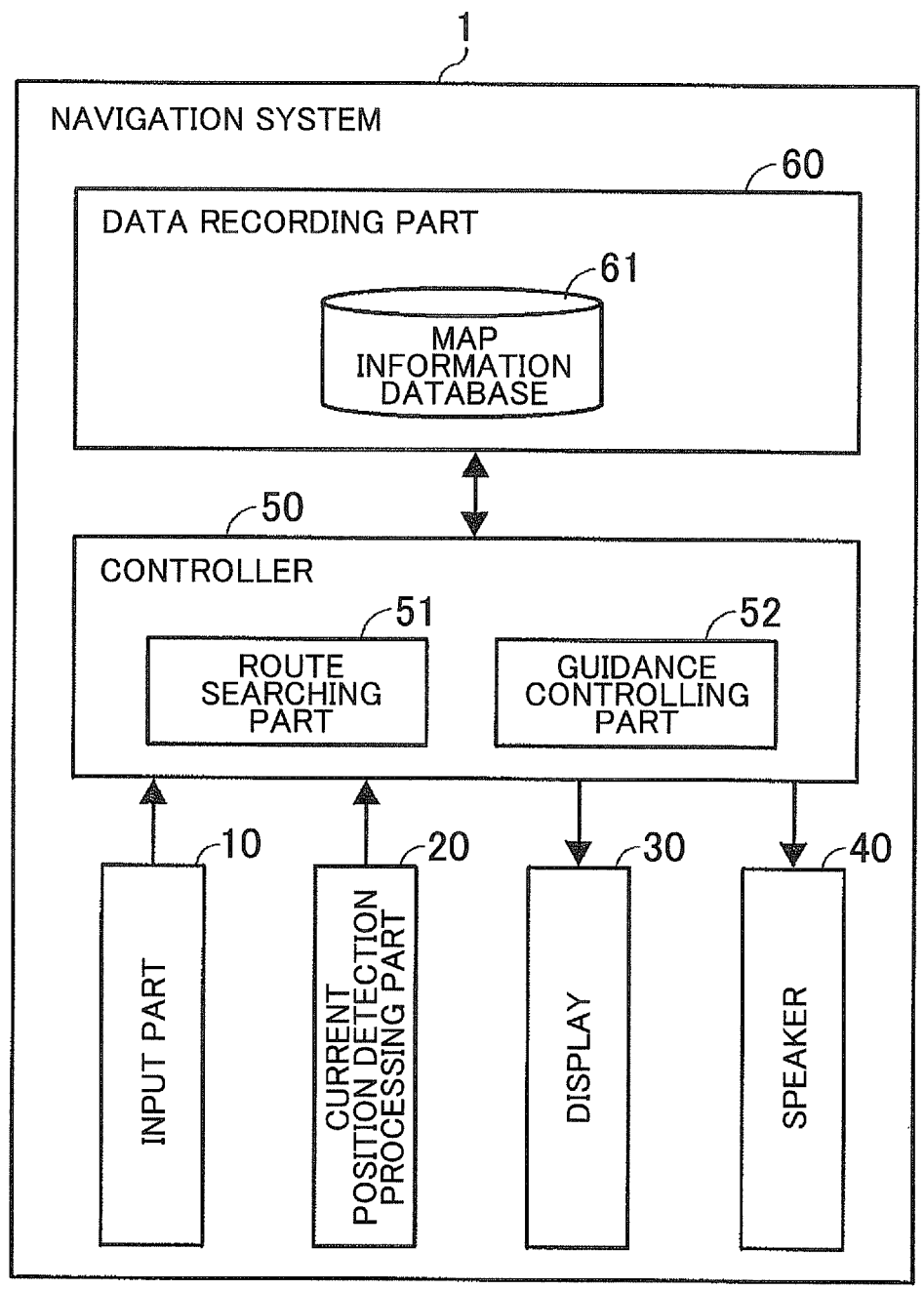
FIG. 1 is a block diagram illustrating a navigation system according to the present example.

Initially, a configuration of the navigation system according to the example is explained. FIG. 1 is a block diagram illustrating the navigation system according the present example. A navigation system 1 is provided with an input part 10, a current position detection processing part 20, a display 30, a speaker 40, a controller 50, and a data recording part 60, as shown in FIG. 1.

A. Input Part

The input part 10 is an input unit that accepts an input operated by a user. The input part 10 is not limited to a specific configuration. For example, the input part 10 may be composed of a touch panel provided on a front side of the display 30, a pressing button, a remote operation unit such as a remote controller, or a voice recognition unit such as a microphone that accepts an audio input.

B. Current Position Detection Processing Part

The current position detection processing part 20 is a current position detecting unit that detects a current position of the vehicle mounted with the navigation system 1. Specifically, the current position detection processing part 20 includes at least one of a GPS (not shown), a geomagnetic sensor (not shown), a distance sensor (not shown), and a gyro sensor (not shown), and detects a current vehicle position (a coordinate), an orientation, and the like in a known method.

C. Display

The display 30 is a display unit that displays various kinds of images based on the control of the controller 50. The display 30 is not limited to a specific configuration. For example, a known liquid crystal display or a flat panel display such as an organic EL display can be utilized.

D. Speaker

The speaker 40 is an output unit that outputs various kinds of audio based on the control of the controller 50. The audio outputted by the speaker 40 is not limited to a specific manner. The audio can be a synthetic audio generated as needed or a previously recorded audio.

E. Controller

The controller 50 is a control unit that controls the navigation system 1, specifically a computer provided with a CPU, various kinds of programs recognized and executed on the CPU (including a basic control program such as an OS and an application program to be activated on the OS and realize specific functions), and an internal memory (storage medium) such as a RAM for storing the programs and various kinds of data. Particularly, a navigation program according to the example is installed in the navigation system 1 through an arbitrary recording medium or a network to substantially form respective parts of the controller 50. (Note: the term "storage medium" as used herein is not intended to encompass transitory signals.)

The controller 50 is, in terms of function concept, provided with a route searching part 51 and a guidance controlling part 52. The route searching part 51 is a route searching unit that searches for a moving route of a movable body. The guidance controlling part 52 is a guidance controlling unit that controls to provide guidance regarding a branch point on the moving route. The processing executed by the respective components of the controller 50 is described in detail later.

F. Data Recording Part

The data recording part 60 is a storage medium that records programs and various kinds of data necessary for the operation of the navigation system 1. For example, the data recording part 60 utilizes a magnetic storage medium such as a hard disk (not shown) serving as an external storage device. However, in place of or in combination with the hard disk, other storage medium including a semiconductor-type storage medium such as a flash memory or an optical storage medium such as a DVD and a Blu-ray disk can be utilized.

The data recording part 60 is provided with a map information database 61 (hereinafter, a database is referred to as "DB"). The map information DB 61 is a map information storage unit that stores map information. The "map information" includes, for example, link data (link numbers, connected node numbers, road coordinates, road attributes, the numbers of lanes, legal speed, driving regulations, and the like), node data (node number, coordinates), feature data (traffic lights, road traffic signs, guard rails, buildings, and the like), facility data (positions of facilities, types of facilities, and the like), geographic data, map display data for displaying a map on the display 30, and the like.

II. Processing

A. Navigation Processing

Figure 2:
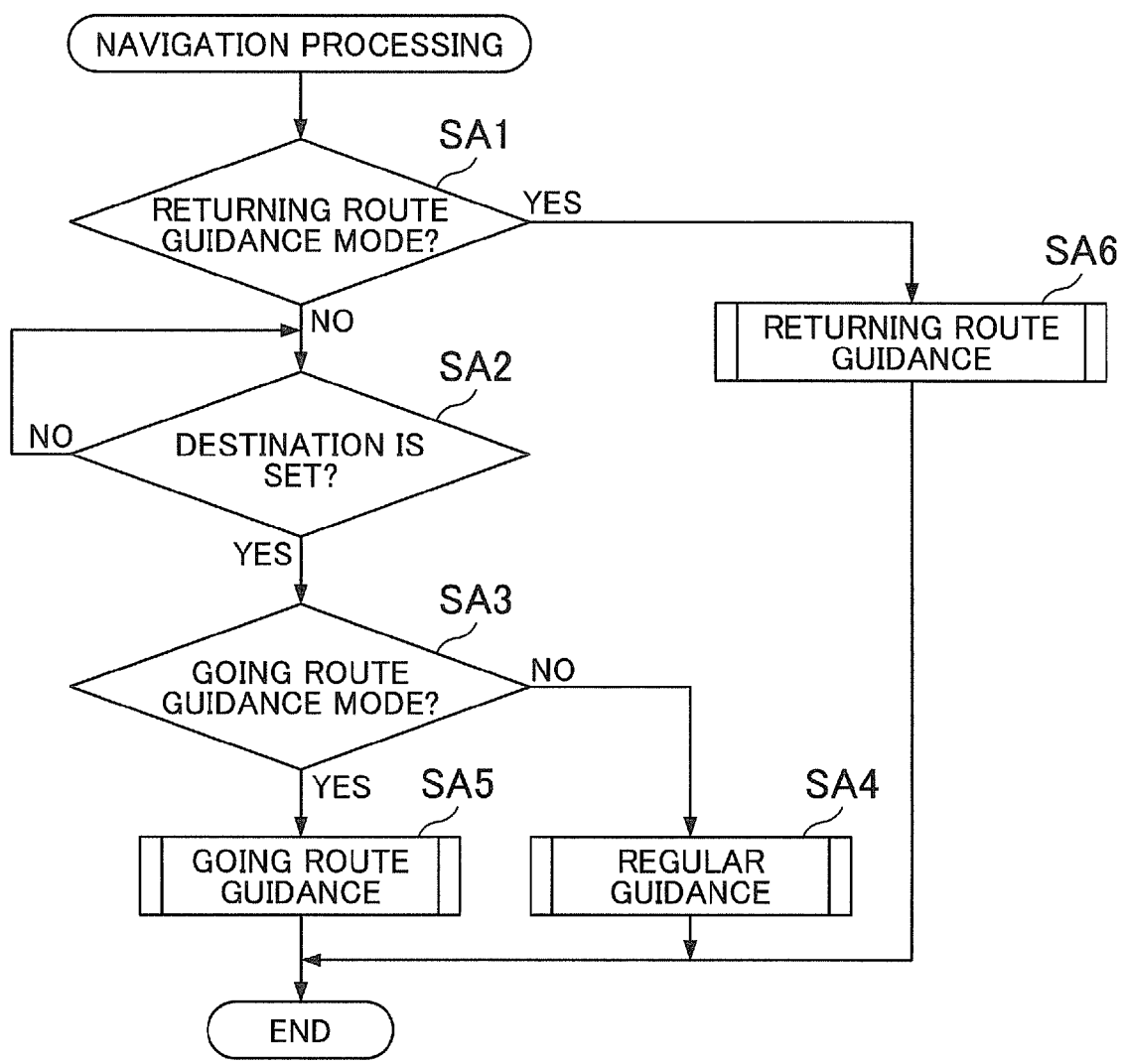
FIG. 2 is a flowchart of a navigation processing algorithm.

Next, navigation processing is explained. FIG. 2 is a flowchart of a navigation processing algorithm (hereinafter, step is referred to as "S" in the explanation of the respective processing). The process algorithm may be implemented in the form of a computer program that is stored in, for example, the data recording part 60 or one or more RAMs and/or ROMs included in the navigation system 1, and executed by the controller 50. Although the structure of the above-described navigation system 1 is referenced in the description of the process, the reference to such structure is exemplary, and the processing method need not be limited by the specific structure of the navigation system 1.

The navigation processing is executed, for example, when the navigation system 1 has been switched on and the input part 10 has accepted an operated input for instructing route guidance.

After the navigation processing has been activated, the guidance controlling part 52 determines whether a mode of route guidance by the navigation system 1 is being set to a "returning route guidance mode" (SA1). The "mode of route guidance" here includes three modes. Depending on the modes, the contents of route guidance by the navigation system 1 vary. The three modes are a "regular guidance mode," in which route guidance as the one given in known navigation systems is provided, a "going route guidance mode," in which the guidance is provided on a going route from a departure point to a destination when a vehicle goes and returns between the departure point and the destination, and a "returning route guidance mode," in which the guidance is provided on a returning route from the destination to the departure point of the going route when a vehicle goes and returns between the departure point and the destination. Any one of these three modes is being set based on the operated input accepted by the input part 10.

As a result of SA1, if the mode of route guidance is not being set to the "returning route guidance mode" (SA1: NO), the guidance controlling part 52 waits until a destination is set (SA2: NO). "Destination setting" here includes a case in which a final destination is set by an operated input through the input part 10, a case in which the order of a plurality of destinations being already set are changed by an operated input through the input part 10 and a different destination is set as the final destination, and a case in which the final destination being already set is canceled and another destination is set as the final destination.

When a destination is set (SA2: YES), the guidance controlling part 52 determines whether the mode of route guidance by the navigation system 1 is being set to the "going route guidance mode" (SA3). As the result, if the mode of route guidance is not being set to the "going route guidance mode" (SA3: NO), the guidance controlling part 52 provides route guidance in the "regular guidance mode" (SA4). That is, the guidance controlling part 52 executes regular guidance processing. On the other hand, if the mode of route guidance is being set to the "going route guidance mode" (SA3: YES), the guidance controlling part 52 provides route guidance in the "going route guidance mode" (SA5). That is, the guidance controlling part 52 executes going route guidance processing.

In addition, at SA1, if the mode of route guidance is being set to the "returning route guidance mode" (SA1: YES), the guidance controlling part 52 provides route guidance in the "returning route guidance mode" (SA6). That is, the guidance controlling part 52 executes returning route guidance processing. After the processing at SA4, SA5, or SA6, the controller 50 terminates the navigation processing.

B. Regular Guidance Processing

Figure 3:
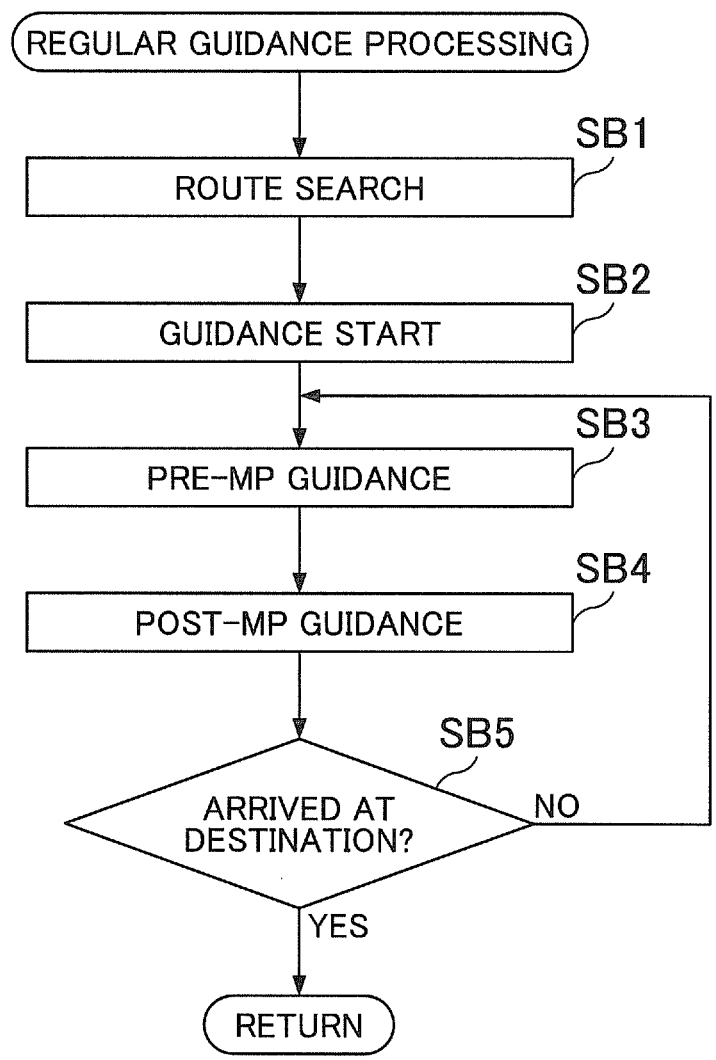
FIG. 3 is a flowchart of a regular guidance processing algorithm.

Here, regular guidance processing is explained. FIG. 3 is a flowchart of a regular guidance processing algorithm. The process algorithm may be implemented in the form of a computer program that is stored in, for example, the data recording part 60 or one or more RAMs and/or ROMs included in the navigation system 1, and executed by the controller 50. Although the structure of the above-described navigation system 1 is referenced in the description of the process, the reference to such structure is exemplary, and the processing method need not be limited by the specific structure of the navigation system 1.

As shown in FIG. 3, when the regular guidance processing is initiated, the route searching part 51 searches for a route from a departure point (for example, the current position detected by the current position detection processing part 20) to a destination (SB1). The route searching part 51 searches for a route using a known route search method such as a Dijkstra method or the like.

Figure 11:
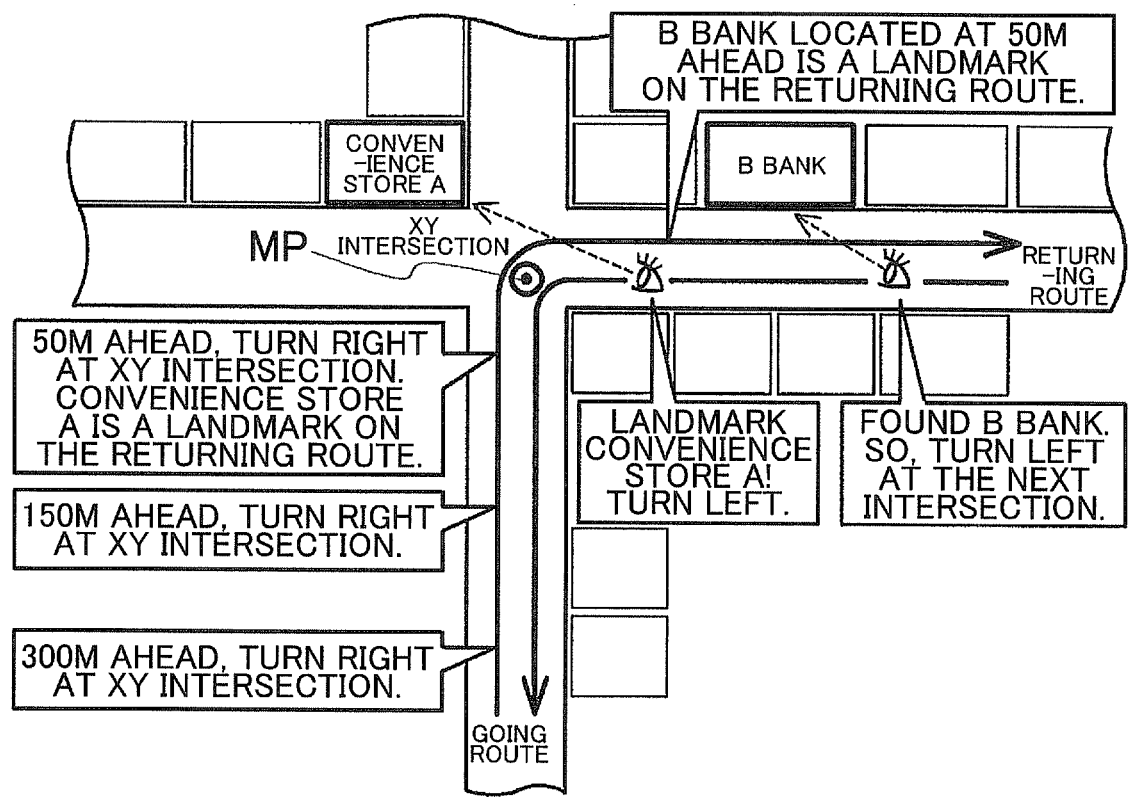
FIG. 11 illustrates contents of guidance when a vehicle passes a MP.

Subsequently, the guidance controlling part 52 starts guidance of the route acquired by the route searching part 51 (SB2). When the vehicle arrives at a predetermined distance from a branch point (that is, an intersection to make a right or left turn, hereinafter, referred to as "MP" (Maneuver Point) as needed) on the route, the guidance controlling part 52 provides pre-MP guidance (SB3). The contents of the pre-MP guidance are not specifically limited. For example, when the vehicle arrives at a predetermined distance from the MP, the guidance regarding the MP (for example, the name of the intersection, the distance to the intersection, the direction (right or left) of the turn, and the like) is provided. FIG. 11 illustrates guidance contents when the vehicle passes a MP. In the example shown in FIG. 11, when the vehicle arrives at a position 300 m from the MP, the guidance controlling part 52 outputs audio guidance as "300 m ahead, turn right at XY intersection" from the speaker 40. In the same manner, when the vehicle arrives at a position 150 m from the MP, the guidance controlling part 52 outputs audio guidance as "150 m ahead, turn right at XY intersection" from the speaker 40. When the vehicle arrives at a position 50 m from the MP, the guidance controlling part 52 outputs audio guidance as "50 m ahead, turn right at XY intersection" from the speaker 40. Together with the audio guidance, the guidance controlling part 52 displays an enlarged map of the vicinity of the MP on the display 30.

With respect to FIG. 3, after the processing at SB3, when the vehicle passes the MP, the guidance controlling part 52 provides post-MP guidance (SB4). The contents of the post-MP guidance are not specifically limited. For example, the distance to the next MP, the distance along the road, and the like are provided (for example, "Follow the road for about 3 km." or the like)

Next, the guidance controlling part 52 determines whether the vehicle has arrived at the destination (SB5). For example, the guidance controlling part 52 determines that the vehicle has arrived at the destination if the vehicle has arrived at a position a predetermined distance from the destination based on the current position of the vehicle detected by the current position detection processing part 20.

As a result, if the vehicle has not arrived at the destination (SB5: NO), the guidance controlling part 52 returns to SB3. Thereafter, the guidance controlling part 52 repeats the processing from SB3 to SB5 until the vehicle arrives at the destination.

On the other hand, if the vehicle has arrived at the destination (SB5: YES), the guidance controlling part 52 outputs a notice indicating that the vehicle has arrived at the destination using the display 30 and/or the speaker 40. Thereafter, the controller 50 terminates the regular guidance processing.

C. Going Route Guidance Processing

Figure 4:
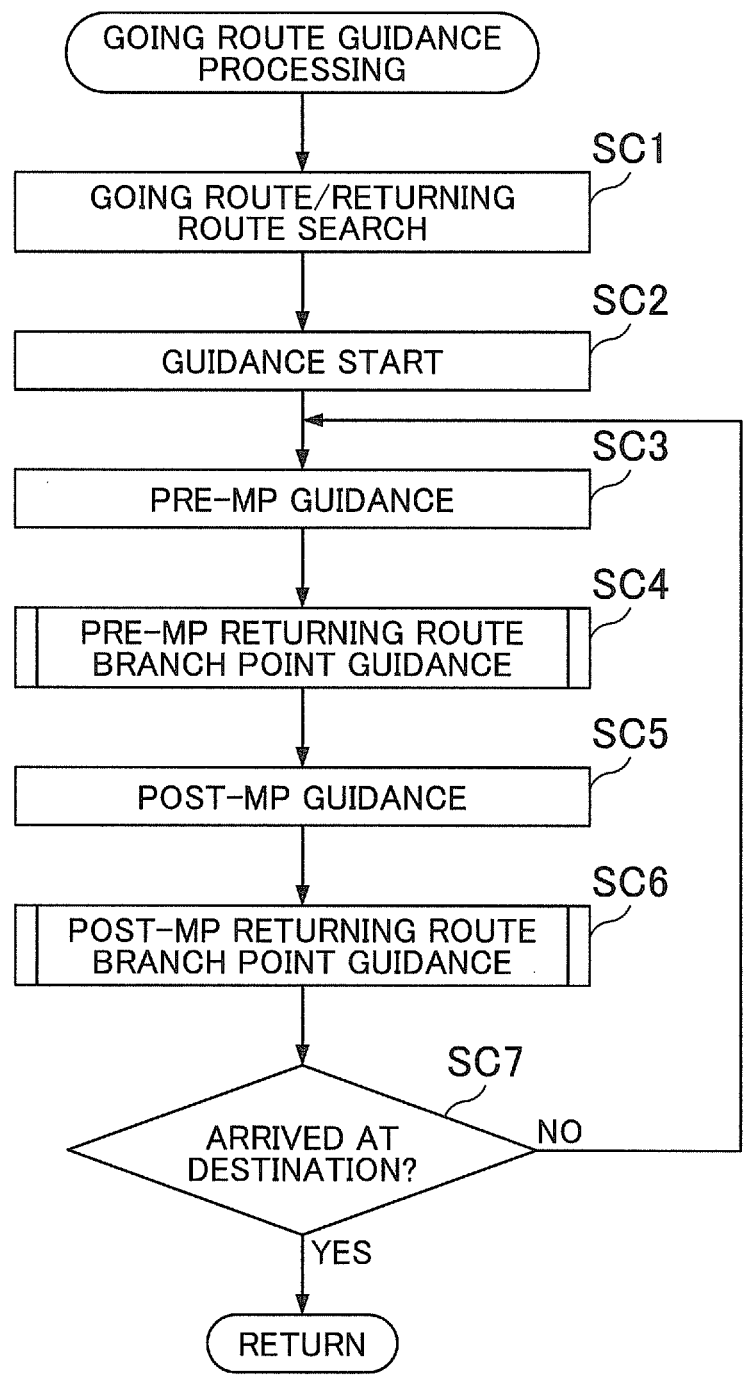
FIG. 4 is a flowchart of a going route guidance processing algorithm.

Next, the going route guidance processing is explained. FIG. 4 is a flowchart of s going route guidance processing algorithm. The process algorithm may be implemented in the form of a computer program that is stored in, for example, the data recording part 60 or one or more RAMs and/or ROMs included in the navigation system 1, and executed by the controller 50. Although the structure of the above-described navigation system 1 is referenced in the description of the process, the reference to such structure is exemplary, and the processing method need not be limited by the specific structure of the navigation system 1. SC3 and SC5 in the going route guidance processing are the same as SB3 and SB4 in the regular guidance processing shown in FIG. 3. Therefore, the explanation is omitted.

As shown in FIG. 4, when the going route guidance processing is initiated, the route searching part 51 searches for a going route from a departure point (for example the current position detected by the current position detection processing part 20) to a destination and also searches for a returning route from the destination to the departure point (SC1).

Subsequently, the guidance controlling part 52 starts guidance for the going route acquired by the route searching part 51 (SC2).

Together with the processing at SC3, or after the processing at SC3, the guidance controlling part 52 executes pre-MP returning route branch point guidance processing for providing guidance regarding a branch point on the returning route before the vehicle passes the branch point on the going route toward the destination (SC4). For example, at SC3, the guidance controlling part 52 provides guidance regarding the MP a plurality of times while the vehicle approaches the MP, and executes the pre-MP returning route branch point guidance processing only when providing the guidance regarding the MP the last time among the plurality of times of guidance (in the example shown in FIG. 11, when the vehicle arrives at a position 50 m from the MP).

D. Pre-MP Returning Route Branch Point Guidance Processing

Figure 5:
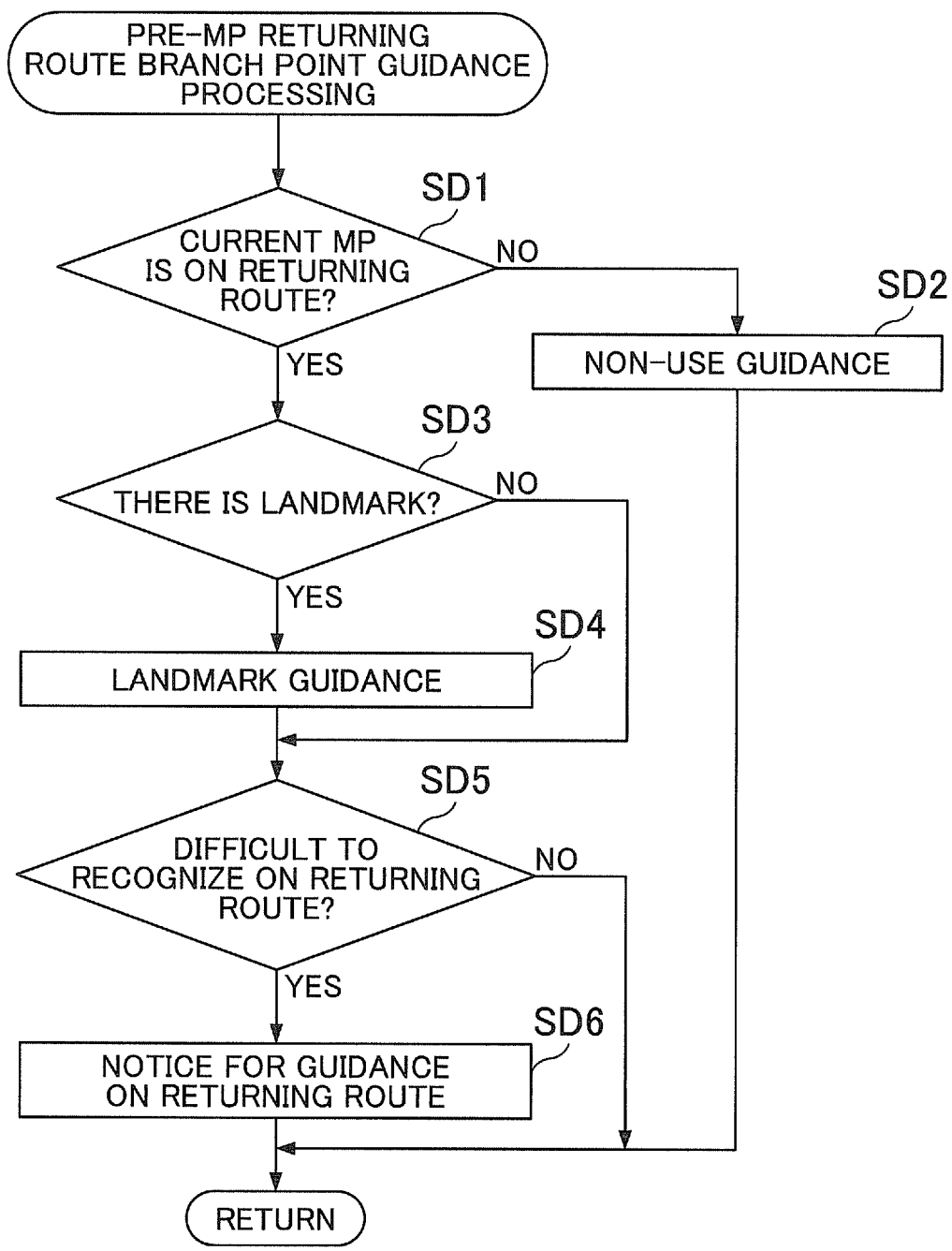
FIG. 5 is a flowchart of a pre-MP returning route branch point guidance processing algorithm.

Here, the pre-MP returning route branch point guidance processing is explained. FIG. 5 is a flowchart of a pre-MP returning route branch point guidance processing algorithm. The process algorithm may be implemented in the form of a computer program that is stored in, for example, the data recording part 60 or one or more RAMs and/or ROMs included in the navigation system 1, and executed by the controller 50. Although the structure of the above-described navigation system 1 is referenced in the description of the process, the reference to such structure is exemplary, and the processing method need not be limited by the specific structure of the navigation system 1.

As shown in FIG. 5, when the pre-MP returning route branch point guidance processing is initiated, the guidance controlling part 52 determines whether the MP, at a position a predetermined distance from which the vehicle has arrived, is located on the returning route acquired at SC1 in FIG. 4 (SD1).

As a result, if the MP, at a position a predetermined distance from which the vehicle has arrived, is not located on the returning route (SD1: NO), the guidance controlling part 52 outputs a notice indicating that the MP will not be passed on the returning route using the display 30 and/or the speaker 40 (SD2). Thereafter, the controller 50 terminates the pre-MP returning route branch point guidance processing.

On the other hand, if the MP, at a position a predetermined distance from which the vehicle has arrived, is located on the returning route (SD1: YES), that is, if the MP is also a branch point on the returning route, the guidance controlling part 52 determines whether there is a landmark for the branch point on the returning route in the vicinity of the MP, by referring to the map information DB 61 (SD3). For example, if there is a kind of facility (a convenience store, a restaurant, a commercial facility, a parking lot, or the like) facing (i.e., adjacent to)

the MP, the guidance controlling part 52 determines that there is a landmark for the branch point on the returning route in the vicinity of the MP. Or, if the MP is named (for example, "XY intersection" or the like), the guidance controlling part 52 determines that there is a landmark for the branch point on the returning route in the vicinity of the MP because the traffic light at the MP can be a landmark.

As a result, if there is a landmark for the branch point on the returning route in the vicinity of the MP (SD3: YES), the guidance controlling part 52 selects the landmark and provides guidance notifying that the selected landmark is a landmark when passing the branch point on the returning route toward the departure point (SD4). In the example shown in FIG. 11, the guidance controlling part 52 selects "convenience store A" facing (i.e., adjacent to) the MP as the landmark for the branch point on the returning route, and if the vehicle has arrived at a position 50 m from the MP, outputs guidance as "50 m ahead, turn right at XY intersection." as well as guidance regarding the branch point on the returning route as "Convenience store A is a landmark on the returning route." by audio from the speaker 40.

Figure 12A:
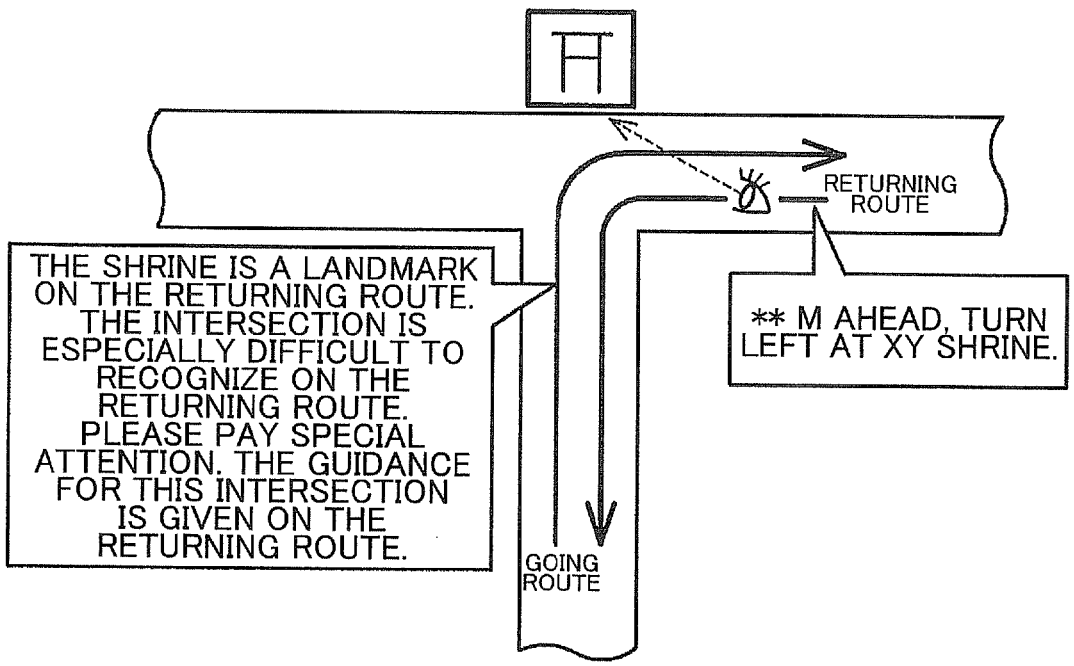
FIGS. 12A and 12B illustrate branch points difficult to recognize for a user.
Figure 12B:
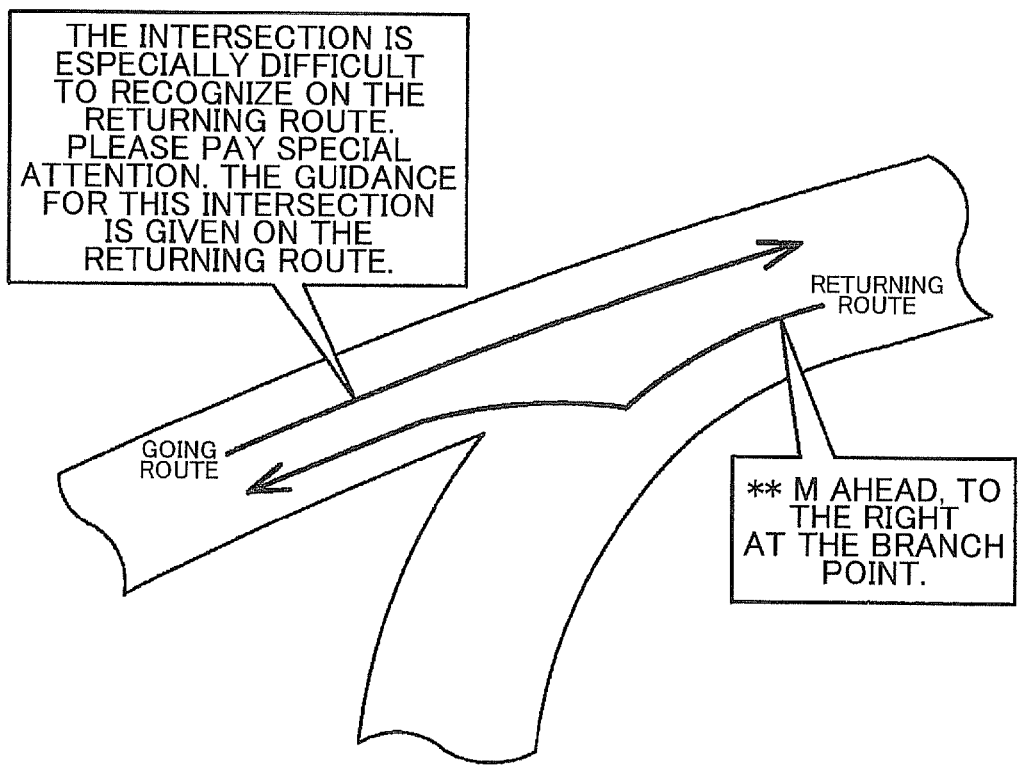

With respect to FIG. 5, if there is not a landmark for the branch point on the returning route in the vicinity of the MP at SD3 (SD3: NO), or after the processing at SD4, the guidance controlling part 52 determines whether the branch point on the returning route is a branch point difficult to recognize for the user (SD5). The "branch point difficult to recognize for the user" is a branch point difficult for the user to recognize that there is a branch point. For example, if an angle between the road on which the vehicle moves toward the branch point on the returning route and a road (a road that is not the acquired returning route) other than the road on which the vehicle moves after passing the branch point on the returning route among the roads connected to the branch point of three roads is equal to or less than a predetermined angle (for example, 10 degrees or less), the guidance controlling part 52 determines that the branch point is the branch point difficult to recognize for the user. FIGS. 12A and 12B illustrate branch points difficult to recognize for the user. FIG. 12A shows a T-shaped road. FIG. 12B shows a merging road. For example, according to FIG. 12A, the angle between the road (the road entering the branch point from the right in FIG. 12A) on which the vehicle moves toward the branch point on the returning route and the road (the road extending from the branch point to the left in FIG. 12A) other than the road (the road extending from the branch point to the bottom in FIG. 12A) on which the vehicle moves after passing the branch point on the returning route is 0 degrees. Therefore, it is determined that the branch point is difficult to recognize for the user. In addition, according to FIG. 12B, the angle between the road (the road entering the branch point from the upper-right in FIG. 12B) on which the vehicle moves toward the branch point on the returning route and the road (the road extending from the branch point to the lower-left in FIG. 12B) other than the road (the road extending from the branch point to the left in FIG. 12B) on which the vehicle moves after passing the branch point on the returning route is 0 degrees. Therefore, it is determined that the branch point is difficult to recognize for the user.

With respect to FIG. 5, as a result of SD5, if the branch point on the returning route is a branch point difficult to recognize for the user (SD5: YES), the guidance controlling part 52 provides a notice indicating that the guidance regarding the branch point is provided on the returning route because the branch point on the returning route is a branch point difficult to recognize for the user (SD6). In the example shown in FIGS. 12A and 12B, the guidance controlling part 52 outputs a notice "The intersection is especially difficult to recognize on the returning route. Please pay special attention. The guidance for this intersection is given on the returning route." as a notice indicating that the guidance regarding the branch point is provided on the returning route by audio from the speaker 40.

With respect to FIG. 5, as a result of SD5, if the branch point on the returning route is not a branch point difficult to recognize for the user (SD5: NO) or after the processing at SD6, the controller 50 terminates the pre-MP returning route branch point guidance processing.

With respect to FIG. 4, together with the processing at SC5, or after the processing at SC5, the guidance controlling part 52 executes post-MP returning route branch point guidance processing for providing guidance regarding the branch point on the returning route after the vehicle has passed the branch point on the going route toward the destination (SC6).

E. Post-MP Returning Route Branch Point Guidance Processing

Figure 6:
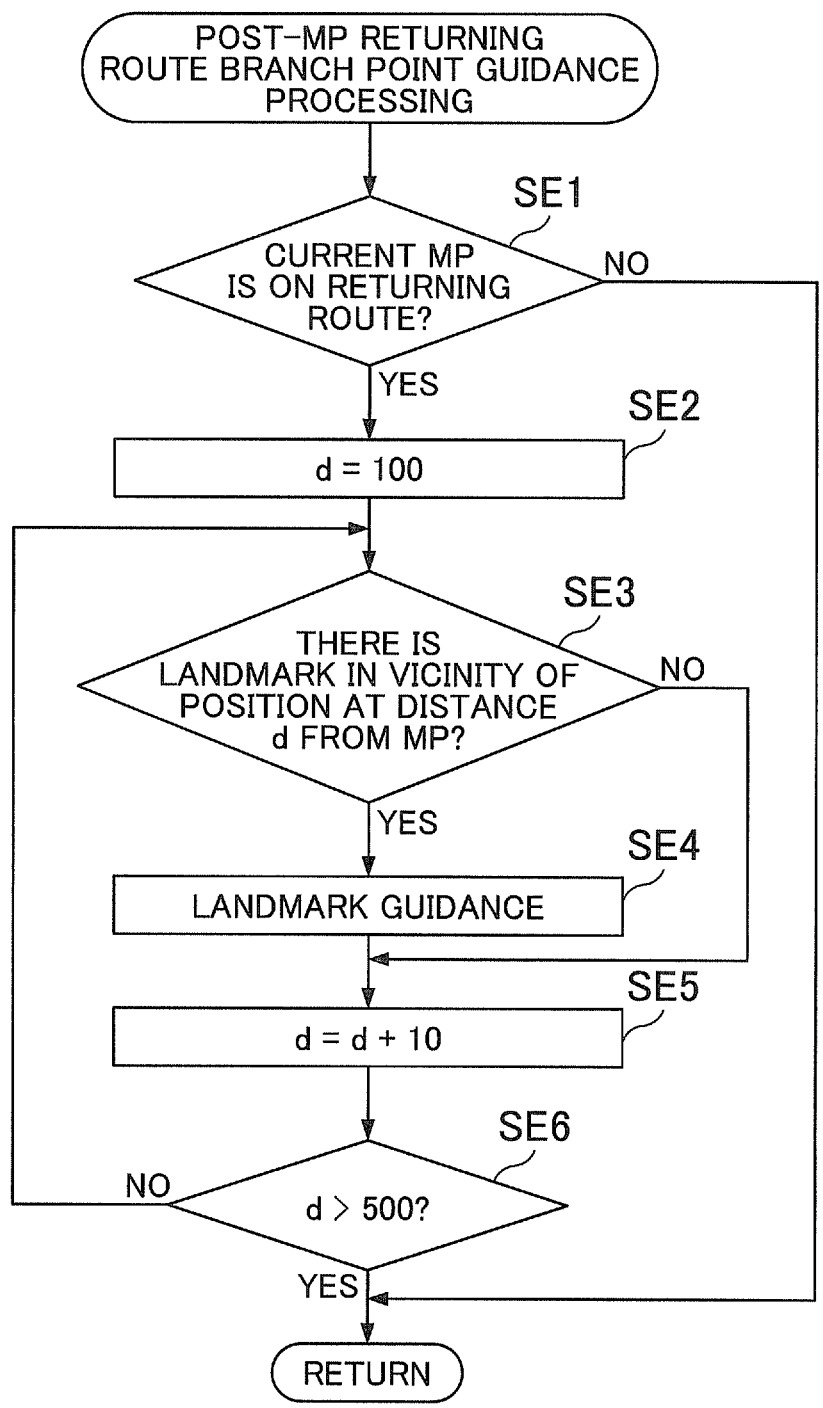
FIG. 6 is a flowchart of a post-MP returning route branch point guidance processing algorithm.

Here, the post-MP returning route branch point guidance processing is explained. FIG. 6 is a flowchart of a post-MP returning route branch point guidance processing algorithm. The process algorithm may be implemented in the form of a computer program that is stored in, for example, the data recording part 60 or one or more RAMs and/or ROMs included in the navigation system 1, and executed by the controller 50. Although the structure of the above-described navigation system 1 is referenced in the description of the process, the reference to such structure is exemplary, and the processing method need not be limited by the specific structure of the navigation system 1.

As shown in FIG. 6, when the post-MP returning route branch point guidance processing is initiated, the guidance controlling part 52 determines whether the MP that the vehicle has passed toward the destination is located on the returning route acquired at SC1 in FIG. 4 (SE1).

As a result, if the MP that the vehicle has passed toward the destination is not located on the returning route (SE1: NO), the controller 50 terminates the post-MP returning route branch point guidance processing.

On the other hand, if the MP that the vehicle has passed toward the destination is located on the returning route (SE1: YES), the guidance controlling part 52 sets a predetermined initial value (100 m in FIG. 6) as a distance d serving as a reference for selecting a landmark for the branch point on the returning route (SE2).

Subsequently, the guidance controlling part 52 determines whether there is a landmark in the vicinity of a position at the distance d from the MP along the road on which the vehicle moves after passing the MP toward the destination (SE3). For example, if there is a kind of facility (a convenience store, a restaurant, a commercial facility, a parking lot, or the like) in the vicinity (for example, within the distance d±5 m from the MP) of the position at the distance d from the MP along the road on which the vehicle moves after passing the MP toward the destination, the guidance controlling part 52 determines that there is a landmark in the vicinity of the position at the distance d from the MP along the road on which the vehicle moves after passing the MP toward the destination.

As a result, if there is a landmark in the vicinity of the position at the distance d from the MP along the road on which the vehicle moves after passing the MP toward the destination (SE3: YES), the guidance controlling part 52 selects the landmark and provides guidance indicating that the selected landmark is a landmark on the returning route when passing the branch point toward the departure point of the going route (SE4). In the example shown in FIG. 11, the guidance controlling part 52 selects, as a landmark for the branch point on the returning route, a "B bank" located in the vicinity of a position at a distance 100 m from the MP along the route on which the vehicle moves after passing the MP toward the destination, and outputs guidance regarding the branch point on the returning route "B bank is a landmark on the returning route" when the vehicle has arrived at a position a predetermined distance (for example, 10 m) from "B bank" by audio from the speaker 40.

With respect to FIG. 6, at SE3, if there is not a landmark in the vicinity of the position at the distance d from the MP along the road on which the vehicle moves after passing the MP toward the destination (SE3: NO) or after the processing at SE4, the guidance controlling part 52 increases the distance d serving as a reference for selecting a landmark for the branch point on the returning route by a predetermined value (10 m in FIG. 6) (SE5).

Subsequently, the guidance controlling part 52 determines whether the distance d exceeds a threshold value (500 m in FIG. 6) (SE6). As a result, if the distance d does not exceed the threshold value (SE6: NO), the guidance controlling part 52 returns to SE3. Thereafter, the guidance controlling part 52 repeats the processing from SE 3 to SE6 till the distance d exceeds the threshold value.

On the other hand, if the distance d exceeds the threshold value (SE6: YES), the controller 50 terminates the post-MP returning route branch point guidance processing.

With respect to FIG. 4, after the processing at SC6, the guidance controlling part 52 determines whether the vehicle has arrived at the destination (SC7). For example, the guidance controlling part 52 determines based on the current position of the vehicle detected by the current position detection processing part 20 that the vehicle has arrived at the destination if the vehicle has arrived at a position within a predetermined distance from the destination.

As a result, if the vehicle has not arrived at the destination (SC7: NO), the guidance controlling part 52 returns to SC3. Thereafter, the guidance controlling part 52 repeats the processing from SC3 to SC7 till the vehicle arrives at the destination.

On the other hand, if the vehicle has arrived at the destination (SC7: YES), the guidance controlling part 52 outputs a notice indicating that the vehicle has arrived at the destination using the display 30 and/or the speaker 40 and terminates the going route guidance processing.

F. Returning Route Guidance Processing

Figure 7:
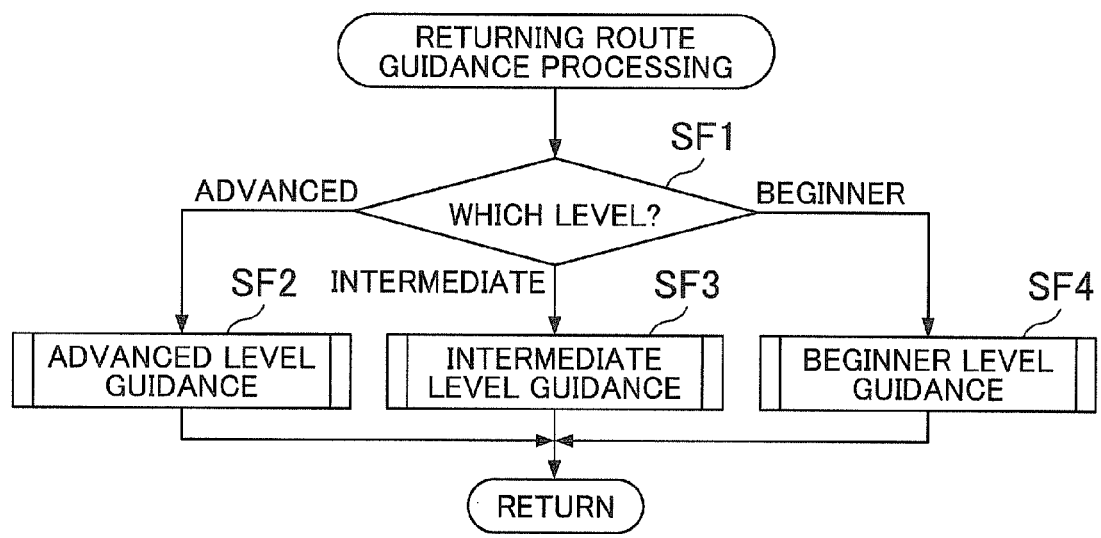
FIG. 7 is a flowchart of a returning route guidance processing algorithm.

Next, the returning route guidance processing is explained. FIG. 7 is a flowchart of a returning route guidance processing algorithm. The process algorithm may be implemented in the form of a computer program that is stored in, for example, the data recording part 60 or one or more RAMs and/or ROMs included in the navigation system 1, and executed by the controller 50. Although the structure of the above-described navigation system 1 is referenced in the description of the process, the reference to such structure is exemplary, and the processing method need not be limited by the specific structure of the navigation system 1.

In the returning route guidance processing, the guidance controlling part 52 controls to provide the guidance regarding the branch point on the returning route based on a guidance standard different from when the vehicle moves toward the destination on the going route.

As shown in FIG. 7, when the returning route guidance processing is initiated, the guidance controlling part 52 determines a level of route guidance on the returning route (SF1). The "level of route guidance on the returning route" here means a fullness level, i.e., a guidance reference, when providing the guidance regarding the branch point on the returning route in the "returning route guidance mode." In the present example, the "level of route guidance on the returning route" includes three levels of an "advanced level," an "intermediate level," and a "beginner level." The "advanced level" is a level for users whose ability to learn roads is high, in which a large part of the guidance regarding the branch point on the returning route is skipped. The "intermediate level" is a level for users whose ability to learn roads is lower than the users of the "advanced level," in which a less part of the guidance regarding the branch point on the returning route is skipped compared to the "advanced level." The "beginner level" is a level for users whose ability to learn roads is lower than the users of the "intermediate level," in which a less part of the guidance regarding the branch point on the returning route is skipped compared to the "intermediate level." Any one of the three levels is being set based on an operated input accepted by the input part 10.

As a result of SF1, if the level of route guidance on the returning route is the "advanced level" (SF1: advanced), the guidance controlling part 52 executes advanced level guidance processing (SF2). If the level of route guidance on the returning route is the "intermediate level" (SF1: intermediate), the guidance controlling part 52 executes intermediate level guidance processing (SF3). If the level of route guidance on the returning route is the "beginner level" (SF1: beginner), the guidance controlling part 52 executes beginner level guidance processing (SF4).

After the processing at SF2, SF3, and SF4, the controller 50 terminates the returning route guidance processing.

G. Advanced Level Guidance Processing

Figure 8:
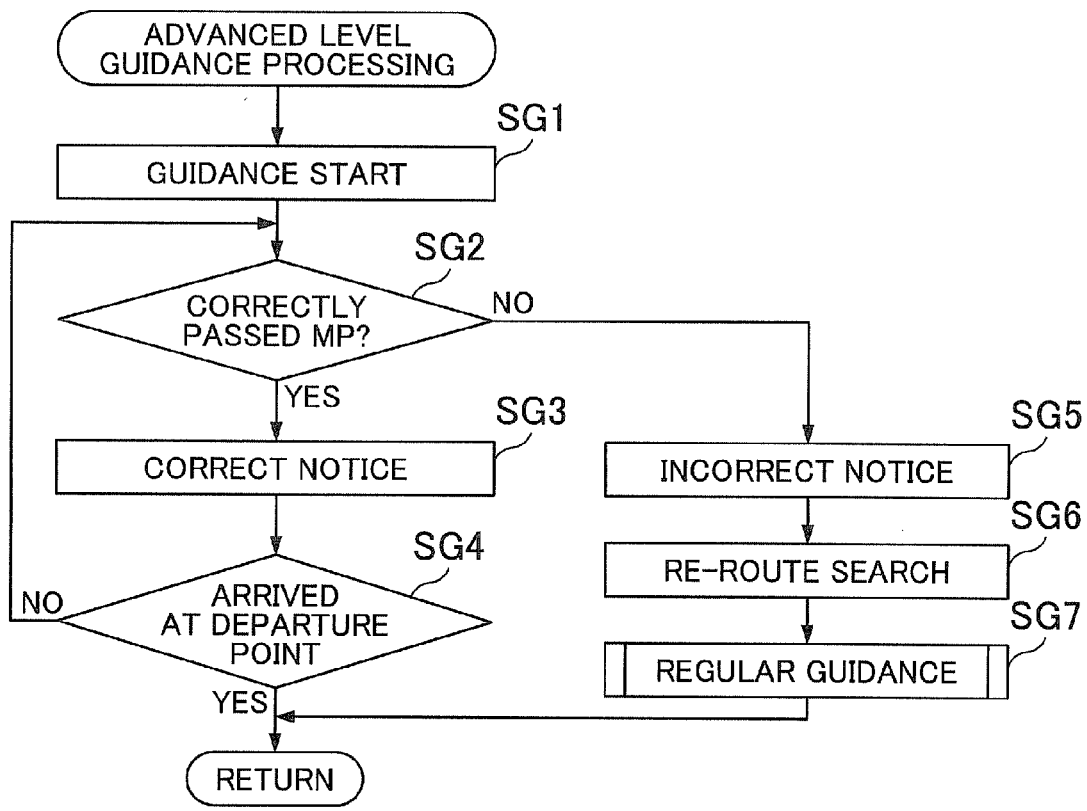
FIG. 8 is a flowchart of a advanced level guidance processing algorithm.

Here, the advanced level guidance processing is explained. FIG. 8 is a flowchart of an advanced level guidance processing algorithm. The process algorithm may be implemented in the form of a computer program that is stored in, for example, the data recording part 60 or one or more RAMs and/or ROMs included in the navigation system 1, and executed by the controller 50. Although the structure of the above-described navigation system 1 is referenced in the description of the process, the reference to such structure is exemplary, and the processing method need not be limited by the specific structure of the navigation system 1.

As shown in FIG. 8, when the advanced level guidance processing is initiated, the guidance controlling part 52 starts guidance of the returning route acquired by the route searching part 51 at SC1 of FIG. 4 (SG1).

The guidance controlling part 52 does not provide the guidance regarding MPs until the vehicle passes the respective MPs on the returning route toward the departure point of the going route. Consequently, the user makes a right or left turn at the respective MPs on the returning route by the user's own judgment.

After the vehicle has passed a MP on the returning route toward the departure point of the going route, the guidance controlling part 52 determines whether the road where the vehicle is moving after passing the MP is the road on the returning route, based on the current position of the vehicle detected by the current position detection processing part 20 (SG2). That is, the guidance controlling part 52 determines whether the vehicle has correctly passed the MP.

As a result, if the road where the vehicle is moving after passing the MP on the returning route is the road on the returning route (if the vehicle has correctly passed the MP) (SG2: YES), the guidance controlling part 52 outputs a notice indicating that the road where the vehicle is moving is the road on the returning route (hereinafter referred to as "correct notice" as needed) using the display 30 and/or the speaker 40

(SG3). In the example shown in FIG. 11, if the user remembers "Convenience store A" and "B bank" as landmarks for the branch point on the returning route in the going route guidance processing in FIG. 4 and correctly makes a left turn at an branch point "XY intersection" on the returning route, the guidance controlling part 52 outputs a chime sound as a correct notice using the speaker 40.

With respect to FIG. 8, after the processing at SG3, the guidance controlling part 52 determines whether the vehicle has arrived at the departure point of the going route (SG4). For example, the guidance controlling part 52 determines that the vehicle has arrived at the departure point of the going route when the vehicle has arrived at a position a predetermined distance from the departure point of the going route, based on the current position of the vehicle detected by the current position detection processing part 20.

As a result, if the vehicle has not arrived at the departure point of the going route (SG4: NO), the guidance controlling part 52 returns to SG2. Thereafter, the guidance controlling part 52 repeats the processing from SG2 to SG4 till the vehicle arrives at the departure point of the going route.

In addition, at SG2, if the road where the vehicle is moving after passing the MP on the returning route is not the road on the returning route (if the vehicle has not correctly passed the MP) (SG2: NO), the guidance controlling part 52 outputs a notice indicating that the road where the vehicle is moving is not the road on the returning route (hereinafter referred to as "incorrect notice," as needed) using the display 30 and/or the speaker 40 (SG5). In the example shown in FIG. 11, if the user does not remember "Convenience store A" and "B bank" for which the guidance was provided as landmarks for the branch point on the returning route in the going route guidance processing in FIG. 4 and goes straight at the branch point "XY intersection" on the returning route, or if the user remembers these landmarks but wrongly makes a right turn to at the branch point "XY intersection" on the returning route by mistake, the guidance controlling part 52 outputs a notice such as "off the guidance route" or the like as the incorrect notice from the speaker 40.

With respect to FIG. 8, after the processing at SG5, the route searching part 51 searches for a route from the current position detected by the current position detection processing part 20 to the departure point of the going route (SG6), and the guidance controlling part 52 performs route guidance in the "regular guidance mode" for the acquired route (SG7). That is, the guidance controlling part 52 executes the regular guidance processing shown in FIG. 3. However, in the regular guidance processing, if the vehicle goes back to the road on the returning route acquired by the route searching part 51 at SC1 in FIG. 4, the route guidance by the advanced level guidance processing in the "returning route guidance mode" may be resumed for the route from the point where the vehicle went back on the route to the departure point of the going route.

If the vehicle has arrived at the departure point of the going route at SG4 (SG4: YES), or after the processing at SG7, the controller 50 terminates the advanced level guidance processing.

H. Intermediate Level Guidance Processing

Figure 9:
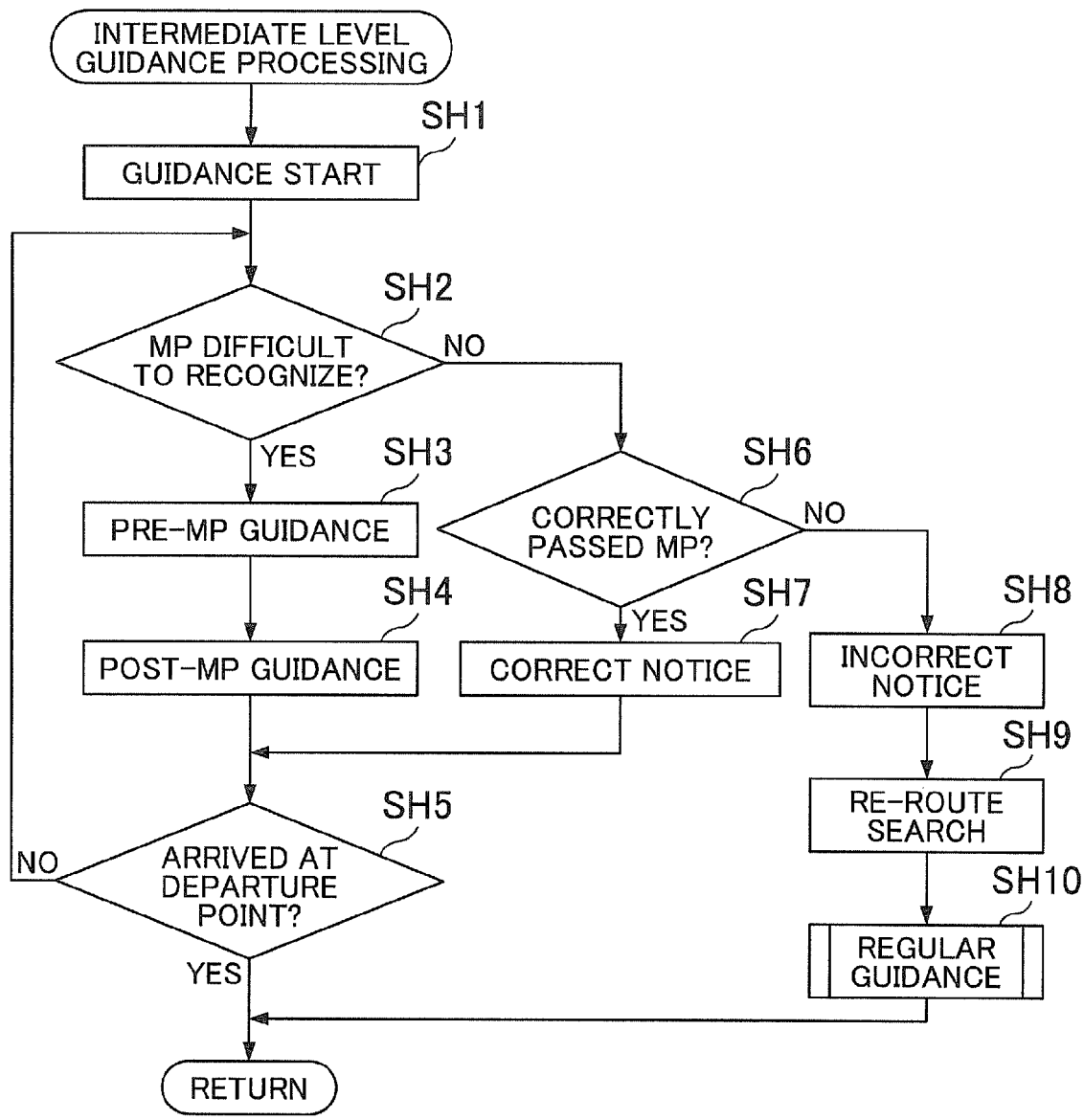
FIG. 9 is a flowchart of a intermediate level guidance processing algorithm.

Next, the intermediate level guidance processing is explained. FIG. 9 is a flow chart of an intermediate level guidance processing algorithm. The process algorithm may be implemented in the faun of a computer program that is stored in, for example, the data recording part 60 or one or more RAMs and/or ROMs included in the navigation system 1, and executed by the controller 50. Although the structure of the above-described navigation system 1 is referenced in the description of the process, the reference to such structure is exemplary, and the processing method need not be limited by the specific structure of the navigation system 1. SH1 in the intermediate level guidance processing is the same as SG1 in the advanced level guidance processing shown in FIG. 8; SH5 is the same as SG4 in FIG. 8; SH6 and SH7 are the same as SG2 and SG3 in FIG. 8; and SH8 to SH10 are the same as SG5 to SG7, respectively. Therefore, the explanation is omitted.

After the processing at SH1, the guidance controlling part 52 determines whether the MP on the returning route at a position a predetermined distance from which the vehicle has arrived is a MP difficult to recognize for the user (SH2). For example, the guidance controlling part 52 determines that the MP determined as "a branch point difficult to recognize for the user" at SD5 in FIG. 5 is determined as a "MP difficult to recognize for the user."

As a result, if the MP on the returning route at a position a predetermined distance from which the vehicle has arrived is a MP difficult to recognize for the user (SH2: YES), the guidance controlling part 52 provides pre-MP guidance in the same manner as when providing guidance in the "regular guidance mode" (SH3). That is, for example, every time the vehicle arrives at a position a predetermined distance from a MP, the guidance controlling part 52 provides the guidance regarding the MP (for example, the name of the intersection, the distance to the intersection, the direction (right or left) of turn, and the like).

In the example shown in FIG. 12A, the guidance controlling part 52 outputs audio guidance "300 m ahead, turn left at XY shrine." from the speaker 40 when the vehicle arrives at a position 300 m from the MP. In the same manner, the guidance controlling part 52 outputs audio guidance "150 m ahead, turn left at XY shrine" from the speaker 40 when the vehicle arrives at a position 150 m from the MP. The guidance controlling part 52 outputs audio guidance "50 m ahead, turn left at XY shrine" from the speaker 40 when the vehicle arrives at a position 50 m from the MP. Along with the audio guidance, the guidance controlling part 52 displays an enlarged map of the vicinity of the MP on the display 30.

In the example shown in FIG. 12B, the guidance controlling part 52 outputs audio guidance "300 m ahead, to the right at the branch point" from the speaker 40 when the vehicle arrives at a position 300 m from the MP. In the same manner, the guidance controlling part 52 outputs audio guidance "150 m ahead, to the right at the branch point" from the speaker 40 when the vehicle arrives at a position 150 m from the MP. The guidance controlling part 52 outputs audio guidance "50 m ahead, to the right at the branch point" from the speaker 40 when the vehicle arrives at a position 50 m from the MP. Along with the audio guidance, the guidance controlling part 52 displays an enlarged map of the vicinity of the MP on the display 30.

With respect to FIG. 9, after the processing at SH3, when the vehicle passes the MP, the guidance controlling part 52 provides post-MP guidance in the same manner as when providing guidance in the "regular guidance mode" (SH4). That is, for example, the guidance controlling part 52 provides guidance for the distance to the next MP, the distance along the road, or the like (for example, "follow the road about 3 km" or the like). After the processing at SH4, the guidance controlling part 52 determines whether the vehicle has arrived at the departure point of the going route (SH5).

In addition, at SH2, if the MP on the returning route at a position the predetermined distance from which the vehicle has arrived is not a MP difficult to recognize for the user (SH2: NO), the guidance controlling part 52 determines whether the vehicle has correctly passed the MP after the vehicle passed the MP on the returning route toward the departure point of the going route (SH6).

I. Beginner Level Guidance Processing

Figure 10:
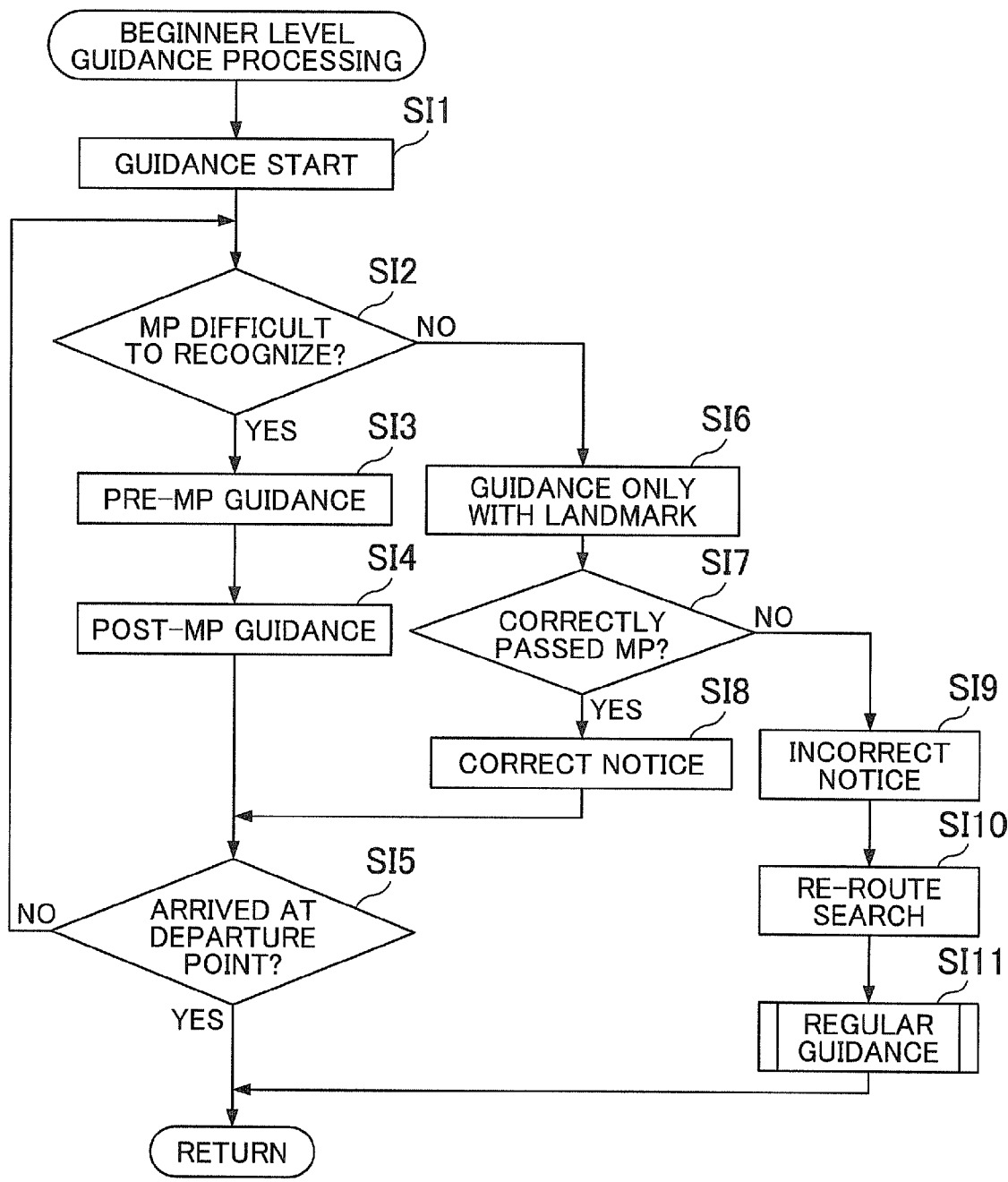
FIG. 10 is a flowchart of a beginner level guidance processing algorithm.

Finally, the beginner level guidance processing is explained. FIG. 10 is a flowchart of a beginner level guidance processing algorithm. The process algorithm may be implemented in the form of a computer program that is stored in, for example, the data recording part 60 or one or more RAMs and/or ROMs included in the navigation system 1, and executed by the controller 50. Although the structure of the above-described navigation system 1 is referenced in the description of the process, the reference to such structure is exemplary, and the processing method need not be limited by the specific structure of the navigation system 1. SI1 in the beginner level guidance processing is the same as SG1 in the advanced level guidance processing shown in FIG. 8; SI2 to SI4 are the same as SH2 to SH4 in the intermediate level guidance processing shown in FIG. 9; SI5 is the same as SG4 in FIG. 8; SI7 and SI8 are the same as SG2 and SG3 in FIG. 8; and SI9 to SI11 are the same as SG5 to SG7 in FIG. 8, respectively. Therefore, the explanation is omitted.

At SI2, if the MP at a position the predetermined distance from which the vehicle has arrived is not a MP difficult to recognize for the user (SI2: NO), the guidance controlling part 52 provides guidance only with the landmark for the MP on the returning route (SI6). For example, every time the vehicle arrives at a position a certain distance from a MP on the returning route, the guidance controlling part 52 provides the guidance for the MP only with the landmark with which the guidance was provided as the landmark for the branch point on the returning route in the going route guidance processing in FIG. 4. That is, the guidance regarding the MP itself on the returning route (for example, the name of the intersection, the distance to the intersection, the direction (right or left) of turn, or the like) is not provided. In the example shown in FIG. 11, the guidance controlling part 52 outputs only guidance notifying that the "Convenience store A" and "B bank," with which the guidance was provided as the landmark for the branch point on the returning route in the going route guidance processing in FIG. 4, such as "B bank is a landmark" or "Convenience store A is a landmark" from the speaker 40.

III. Effect

According to the example, the route searching part 51 searches for a going route from a departure point to a destination of a movable body and also searches for a returning route from the destination to the departure point. The guidance controlling part 52 selects a landmark for a branch point on the returning route and controls to provide the guidance regarding the branch point on the returning route using the selected landmark while the current position is moving on the going route toward the destination. Therefore, it is possible to actively make the user to remember the landmark for the branch point on the returning route while moving on the going route. Thereby, it is possible to provide guidance that activates the user's memory and thought and enables the user to memorize roads.

In addition, the guidance controlling part 52 controls to provide guidance notifying that the selected landmark is a landmark when passing the branch point on the returning route toward the departure point, before or after the movable body passes the branch point on the going route toward the destination. Therefore, it is possible to make the user remember the landmark for the branch point on the returning route in association with the branch point on the going route. Thereby, it is possible to provide guidance that activates the user's memory and thought and enables the user to memorize roads.

In addition, the guidance controlling part 52 selects, as the landmark for the branch point on the returning route, a landmark along a road where the movable body moves after passing the branch point on the going route toward the destination. Therefore, it is possible to provide guidance using the landmark visible for the user when the movable body moves on the returning route toward the branch point on the returning route as the landmark for the branch point on the returning route. Thereby, it is possible to provide guidance with the landmark useful for the user to memorize roads.

In addition, the guidance controlling part 52, after the movable body passes the branch point on the going route toward the destination, controls to provide the guidance regarding the branch point on the returning route using the landmark selected by the guidance controlling part 52. Therefore, it is possible to provide guidance that enables the user to concentrate on the recognition of the landmark for the branch point on the returning route.

In addition, the guidance controlling part 52, before the movable body passes the branch point on the going route toward the destination, controls to provide the guidance regarding the branch point on the returning route using the landmark selected by the guidance controlling part 52. Therefore, it is possible to provide guidance that enables the user to recognize the landmark for the branch point on the returning route in association with the image of the branch point on the going route.

Especially, the guidance controlling part 52, before the movable body passes the branch point on the going route toward the destination, controls to provide the guidance regarding the branch point a plurality of times while the movable body approaches the branch point and provide the guidance regarding the branch point on the returning route using the landmark selected by the guidance controlling part 52 only when providing the guidance regarding the branch point the last time among the plurality of times of guidance. Therefore, it is possible to provide guidance that enables the user to further surely recognize the landmark for the branch point on the returning route in association with the image of the branch point on the going route.

In addition, the guidance controlling part 52, when the movable body is moving on the returning route toward the departure point, controls to provide the guidance regarding the branch point on the returning route based on a guidance standard different from when the movable body is moving on the going route toward the destination. Therefore, it is possible to provide guidance that makes the user move on the returning route relying on the user's memory. Thereby, it is possible to provide guidance that activates the user's memory and thought and enables the user to memorize roads.

In addition, the guidance controlling part 52, when the movable body moves on the returning route toward the departure point, partially or totally skips the guidance regarding the branch point on the returning route. Therefore, the user has to make a right or left turn or the like at the branch point on the returning route by the user's own judgment. Therefore, it is possible to provide guidance that makes the user move on the returning route relying on the user's memory. Thereby, it is possible to provide guidance that activates the user's memory and thought and enables the user to memorize roads.

In addition, the guidance controlling part 52, when the movable body moves on the returning route toward the departure point, controls to provide guidance only with the landmark for the branch point on the returning route. Therefore, it is possible to provide guidance that makes the user move on the returning route relying on the user's memory while giving the user a hint for the branch point on the returning route. Thereby, it is possible to provide guidance that activates the user's memory and thought and enables the user to memorize roads.

In addition, the guidance controlling part 52, after the movable body passes the branch point on the returning route toward the departure point, controls to provide guidance notifying whether a road on which the movable body is moving after passing the branch point is a road on the returning route. Therefore, it is possible to provide guidance that makes the user recognize whether the user's memory is correct and activates the user's memory and thought.

IV. Modifications and Variations

Problems to be solved by the inventive principles and effects of the inventive principles are not limited to the contents described above, and may vary depending on the environment where the inventive principles are executed and/or details of the configuration. Therefore, only a part of the problems described above may be solved, or only a part of the effects described above may be accomplished. Further, while various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying inventive principles. Examples of some of these alternatives are described below.

A. Configuration

In addition, the electronic constituent elements described above are merely functional concepts, and need not be physically configured as illustrated in the drawings. That is, the specific form of division/integration of each portion is not limited to that shown in the drawings. The constituent elements, as a whole or in part, can be divided and/or integrated in any manner either functionally or physically based on various types of loads or use conditions. For example, the navigation system 1 may be installed to a vehicle or a mobile information terminal as an integrated device. Or, the controller 50 and the data recording part 60 may be separately installed to a vehicle, a mobile information terminal, a center device, and the like using network.

In addition, in the aforementioned example, a case in which the navigation system 1 is installed in a vehicle serving as a movable body is exemplified. However, the navigation system 1 can be used in the same manner as the aforementioned example also in a case in which a person serving as a movable body carries a mobile information terminal partially or totally mounted with the navigation system 1.

B. Processing

In the aforementioned example, a case in which, when the movable body is moving on the returning route toward the departure point, the guidance regarding the branch point on the returning route is provided based on the guidance standard different from when the movable body is moving on the going route toward the destination, is exemplified with a case in which the guidance regarding the branch point on the returning route is skipped in the returning route guidance processing in FIG. 7. The guidance reference when the movable body is moving on the returning route toward the departure point may be differentiated from when the movable body is moving on the going route toward the destination, by setting the distance or time from the guidance point, at which the guidance regarding the branch point on the returning route is provided when the movable body is moving on the returning route toward the departure point, to the branch point shorter than the distance or time from the guidance point, at which the guidance regarding the branch point on the going route is provided when the movable body is moving on the going route toward the destination, to the branch point. For example, if the guidance regarding a MP is provided when the vehicle has arrived at the respective positions of 300 m, 150 m, and 50 m from the MP on the going route in the pre-MP guidance of the going route guidance processing, the guidance regarding the MP may be provided when the vehicle has arrived at a position of 30 m from the MP on the returning route in the returning route guidance processing. Thereby, it is possible to make the user determine the direction (right or left) of the turn or the like at the branch point on the returning route before the guidance regarding the branch point on the returning route is provided, which enables to activate the user's memory and thought and enables the user to memorize roads.

In addition, in the aforementioned example, a case in which the guidance on the returning route from the destination to the departure point of the going route is provided in the returning route guidance processing is exemplified. However, it is not limited to the "returning route from the destination to the departure point of the going route." The route guidance between arbitrary two points may be provided in the returning route guidance processing.

For example, if the combination of the departure point and the destination is the same as a combination of a departure point and a destination for which the route guidance was provided in the past, the route guidance from the departure point to the destination may be provided by the same processing as the returning route guidance processing. For example, the route searching part 51, every time route search is performed, records the combination of the departure point and the destination of the acquired route in the data recording part 60. When a destination is set, if a combination of a destination within a predetermined distance (for example, 300 m) from the set destination and a departure point within a predetermined distance (for example, 300 m) from the current departure point (for example, the current position detected by the current position detection processing part 20) is recorded in the data recording part 60, the guidance controlling part 52 provides route guidance from the current departure point to the set destination by the same processing as the returning route guidance processing. That is, if the level of route guidance is the "advanced level," the guidance regarding a MP is not provided before passing the MP on the acquired route, and the guidance notifying whether the vehicle correctly has passed the MP is only provided. In addition, the level of route guidance is the "intermediate level," only if the MP on the acquired route is a MP difficult for the user to recognize, pre-MP guidance and/or post-MP guidance is provided for the MP. For other MPs, in the same manner as the "advanced level," the guidance regarding the respective MPs is not provided before passing the respective MPs on the acquired route, and the guidance notifying whether the vehicle has correctly passed the respective MPs is provided. If the level of route guidance is the "beginner level," only if the MP on the acquired route is a MP difficult for the user to recognize, pre-MP guidance and/or post-MP guidance is provided for the MP. For other MPs, the guidance only using the landmark for the respective MPs is provided. Thereby, it is possible to provide guidance that makes the user move on the current route relying on the user's memory when having moved on the same route in the past, which enables to activate the user's memory and thought and enables the user to memorize roads.

In addition, even if the route from the departure point to the destination is a route where the user moves for the first time, the route guidance from the departure point to the destination may be performed by the same processing as the returning route guidance processing. That is, when a destination is set, even if a combination of a destination within a predetermined distance (for example, 300 m) from the set destination and a departure point within a predetermined distance (for example, 300 m) from the current departure point (for example, the current position detected by the current position detection processing part 20) is not recorded in the data recording part 60, the guidance controlling part 52 may provide the route guidance from the current departure point to the set destination by the same processing as the returning route guidance processing. In such case, the guidance controlling part 52, for example, by setting the level of route guidance to the "beginner level," provides pre-MP guidance and/or post-MP guidance for MPs, which are on the acquired route and difficult to recognize for the user, and provides guidance only with landmarks for other MPs. Thereby, for example, if the user memorizes the route by previously confirming the route on the map, it is possible to provide guidance that makes the user move on the current route relying on the user's memory, and to provide guidance that activates the user's memory and thought and enables the user to memorize roads.

What is claimed is:

1. A navigation system comprising: a current position detecting unit that detects a current position of a movable body; and a controller that:
   identifies a destination for the moveable body;
   searches for a going route from a departure point to the destination;
   searches for a returning route from the destination to the departure point; selects a landmark for a branch point along the returning route; and
   after the movable body passes the branch point on the going route and
   while the movable body is still traveling the going route, provides returning-route guidance regarding the branch point using the selected landmark to help a user remember an importance of the selected landmark when later traveling the returning route
   wherein the controller: provides guidance regarding the branch point a plurality of times and provides the returning-route guidance regarding the branch point on the returning route by using the selected landmark only when providing the guidance regarding the branch point a last time among the plurality of times of providing guidance regarding the branch point.

2. The navigation system according to claim 1, wherein the controller:
   provides the returning-route guidance notifying that the selected landmark is a landmark on the returning route at a timing after the current position passes the branch point on the going route.

3. The navigation system according to claim 1, wherein the controller:
   selects, as the landmark for the branch point on the returning route, a landmark along a road on which the movable body moves after passing the branch point on the going route.

4. The navigation system according to claim 1, wherein the controller:
   when the movable body is moving along the returning route, provides the returning-route guidance regarding the branch point on the returning route based on a guidance standard different from a guidance standard for the branch point used when the movable body is moving along the going route.

5. The navigation system according to claim 4, wherein the controller:
   when the movable body moves on the returning route, partially or totally skips the returning-route guidance regarding the branch point on the returning route.

6. The navigation system according to claim 4, wherein the controller:
   when the movable body moves on the returning route, provides the returning-route guidance only with the landmark for the branch point on the returning route.

7. The navigation system according to claim 4, wherein the controller:
   sets a first distance or a first time from a guidance point at which the returning-route guidance regarding the branch point is provided when the movable body is moving along the returning route to the branch point shorter than a respective second distance or a second time from a guidance point at which the returning-route guidance regarding the branch point is provided when the movable body is moving along the going route to the branch point.

8. The navigation system according to claim 1, wherein the controller:
   after the movable body passes the branch point on the returning route, provides returning-route guidance notifying whether a road on which the movable body is moving after passing the branch point is a road on the returning route.

9. A navigation method comprising:
   detecting, with a detector, a current position of a movable body;
   receiving, with a controller, an input identifying a destination for the moveable body;
   searching, with the controller, for a going route from a departure point to the destination;
   searching, with the controller, for a returning route from the destination to the departure point;
   selecting, with the controller, a landmark for a branch point along the returning route; and
   after the movable body passes the branch point on the going route and while the movable body is still traveling the going route, providing, with the controller, returning-route guidance regarding the branch point using the selected landmark to help a user remember the importance of the selected landmark when later traveling the returning route
   providing, with the controller, guidance regarding the branch point a plurality of times and providing the returning-route guidance regarding the branch point on the returning route by using the selected landmark only when providing the guidance regarding the branch point a last time among the plurality of times of providing guidance regarding the branch point.

10. The navigation method according to claim 9, further comprising:
    providing the returning-route guidance notifying that the selected landmark is a landmark on the returning route at a timing after the current position passes the branch point on the going route.

11. The navigation method according to claim 9, further comprising:
    selecting, as the landmark for the branch point on the returning route, a landmark along a road on which the movable body moves after passing the branch point on the going route.

12. The navigation method according to claim 9, further comprising:

when the movable body is moving along the returning route, providing the returning-route guidance regarding the branch point on the returning route based on a guidance standard different from a guidance standard for the branch point used when the movable body is moving along the going route.

13. The navigation method according to claim 12, further comprising:
when the movable body moves on the returning route, partially or totally skipping the returning-route guidance regarding the branch point on the returning route.

14. The navigation method according to claim 12, further comprising:
when the movable body moves on the returning route, providing the returning-route guidance only with the landmark for the branch point on the returning route.

15. The navigation method according to claim 12, further comprising:
setting, with the controller, a first distance or a first time from a guidance point at which the returning-route guidance regarding the branch point is provided when the movable body is moving along the returning route to the branch point shorter than a respective second distance or a second time from a guidance point at which the returning-route guidance regarding the branch point is provided when the movable body is moving along the going route to the branch point.

16. The navigation method according to claim 9, further comprising:
after the movable body passes the branch point on the returning route, providing, with the controller, returning-route guidance notifying whether a road on which the movable body is moving after passing the branch point is a road on the returning route.

17. A computer-readable medium storing a computer-executable navigation program, the program comprising:
instructions for detecting a current position of a movable body; instructions for identifying a destination for the moveable body; instructions for searching for a going route from a departure point to the destination;
instructions for searching for a returning route from the destination to the departure point;
instructions for selecting a landmark for a branch point along the returning route; and
instructions for, after the movable body passes the branch point on the going route and while the movable body is still traveling the going route, providing returning-route guidance regarding the branch point using the selected landmark to help a user remember the importance of the selected landmark when later traveling the returning route;
wherein the controller: provides guidance regarding the branch point a plurality of times and provides the returning-route guidance regarding the branch point on the returning route by using the selected landmark only when providing the guidance regarding the branch point a last time among the plurality of times of providing guidance regarding the branch point.

* * * * *